US012562778B2

(12) United States Patent (10) Patent No.: US 12,562,778 B2

Flask et al. (45) Date of Patent: Feb. 24, 2026

---

(54) DETECTING RADIO FREQUENCY SIGNAL LEAKAGE USING CABLE MODEM OUDP PATTERNS

(71) Applicant: Viavi Solutions Inc., Chandler, AZ (US)

(72) Inventors: Robert Flask, New Palestine, IN (US); Dan K. Chappell, Indiannapolis, IN (US)

(73) Assignee: Viavi Solutions Inc., Chandler, AZ (US)

( * ) Notice: Subject to any disclaimer, the term of this patent is extended or adjusted under 35 U.S.C. 154(b) by 44 days.

(21) Appl. No.: 18/775,657

(22) Filed: Jul. 17, 2024

(65) Prior Publication Data

US 2026/0025166 A1    Jan. 22, 2026

(51) Int. Cl.
H04B 3/46 (2015.01)
H04L 12/28 (2006.01)

(52) U.S. Cl.
CPC ........... H04B 3/46 (2013.01); H04L 12/2801 (2013.01)

(58) Field of Classification Search
CPC ......... H04B 3/46; H04B 3/487; H04B 3/493; H04B 3/32; H04B 3/34; H04B 3/28; H04B 3/30; H04B 3/40; H04B 3/42; H04L 12/2801; H04L 12/28; H04L 12/42; H04L 12/437

See application file for complete search history.

(56) References Cited

U.S. PATENT DOCUMENTS

| | | | |
|---|---|---|---|
| 3,908,165 | A | 9/1975 | Cauldwell |
| 5,121,342 | A | 6/1992 | Szymborski et al. |
| 5,263,185 | A | 11/1993 | Bush |
| 5,451,839 | A | 9/1995 | Rappaport et al. |
| 5,602,750 | A | 2/1997 | Severt et al. |
| 5,867,206 | A | 2/1999 | Voght et al. |
| 5,938,737 | A | 8/1999 | Smallcomb et al. |
| 6,061,393 | A | 5/2000 | Tsui et al. |

(Continued)

OTHER PUBLICATIONS

"Broadcom adds VoIP Telephony and Home Networking Technology to Industry-Leading DOCSIS Cable Modem Chip," http://www.broadcom.com/cgi-bin/pr/prps.cgi?pr-id=PR000919, Sep. 19, 2000, 5 pages.

(Continued)

*Primary Examiner* — Khanh C Tran
(74) *Attorney, Agent, or Firm* — DLA PIPER LLP US

(57) ABSTRACT

A method of detecting a radio frequency signal leakage in a wired cable network may be provided. The method may be performed by a testing instrument. The method may include scanning wireless radio frequency signals in a test area. The method may also include receiving a wireless radio frequency signal in response to the scanning and extracting a bit pattern from the received wireless radio frequency signal. The method may further include comparing the extracted bit pattern with one or more predetermined bit patterns associated with corresponding one or more cable modems in the wired cable network. The method may additionally include indicating that the received wireless radio frequency signal is a leakage signal from the wired cable network in response to determining that the extracted bit pattern matches at least one predetermined bit pattern of the one or more predetermined bit patterns.

20 Claims, 3 Drawing Sheets

(56)                    References Cited

U.S. PATENT DOCUMENTS

| 6,061,398 | A | 5/2000 | Satoh et al. |
| 6,229,532 | B1 | 5/2001 | Fujii |
| 6,233,274 | B1 | 5/2001 | Tsui et al. |
| 6,285,685 | B1 | 9/2001 | Bum |
| 6,310,646 | B1 | 10/2001 | Shi et al. |
| 6,385,300 | B1 | 5/2002 | Mohammadian et al. |
| 6,430,185 | B1 | 8/2002 | Kerns et al. |
| 6,487,592 | B1 | 11/2002 | Sawyer et al. |
| 6,493,876 | B1 | 12/2002 | Defreese et al. |
| 6,510,557 | B1 | 1/2003 | Thrift |
| 6,519,241 | B1 | 2/2003 | Theimer |
| 7,076,033 | B2 * | 7/2006 | Sidhu .................. H04L 25/0262 |
| | | | 379/93.08 |
| 7,161,931 | B1 | 1/2007 | Li et al. |
| 7,263,074 | B2 | 8/2007 | LeBlanc |
| 11,398,967 | B1 * | 7/2022 | Stafford ................. H04B 3/487 |
| 2002/0012343 | A1 | 1/2002 | Holloway et al. |
| 2004/0151127 | A1 | 8/2004 | Chong |
| 2005/0047442 | A1 | 3/2005 | Volpe et al. |
| 2005/0058082 | A1 | 3/2005 | Moran et al. |
| 2005/0094639 | A1 | 5/2005 | Miyazaki |
| 2007/0107034 | A1 | 5/2007 | Gotwals |
| 2007/0127711 | A1 | 6/2007 | LeBlanc |
| 2009/0190609 | A1 * | 7/2009 | Basso ....................... H04L 5/14 |
| | | | 370/465 |
| 2018/0287660 | A1 * | 10/2018 | Arambepola ....... H04L 12/2801 |
| 2019/0044626 | A1 * | 2/2019 | Hewavithana ....... H04B 17/104 |

OTHER PUBLICATIONS

McIntosh D., "Building a PacketCableTM Network: A Comprehensive Design for the Delivery of VoIP Services," SCTE Cable Tec-Expo 2002, 10 pages.
QAMLINKTM "Single-Chip 4-Channel VoIP Residential Gateway IC," Broadcom, http://www.broadcom.com/products/3352.html, 2002 Broadcom Corporation, Jan. 31, 2003, 2 pages.
"QAMLINKTM Single-Chip 4-Channel VoIP Broadband Gateway IC," BCM3352 Product Brief: 2000 Broadcom Corporation, 2 pages.

* cited by examiner

100

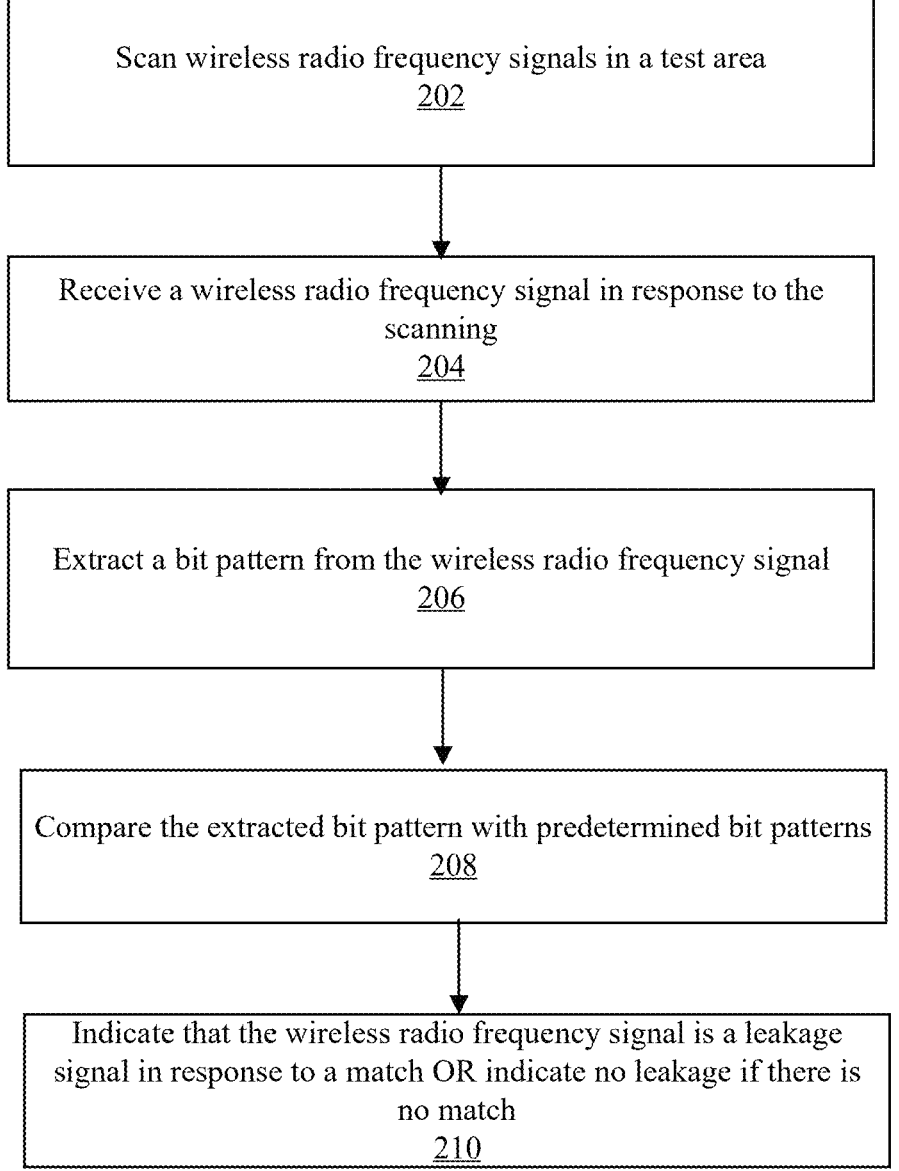

Scan wireless radio frequency signals in a test area
202

Receive a wireless radio frequency signal in response to the scanning
204

Extract a bit pattern from the wireless radio frequency signal
206

Compare the extracted bit pattern with predetermined bit patterns
208

Indicate that the wireless radio frequency signal is a leakage signal in response to a match OR indicate no leakage if there is no match
210

DETECTING RADIO FREQUENCY SIGNAL LEAKAGE USING CABLE MODEM OUDP PATTERNS

CROSS REFERENCE

This application incorporates by reference in its entirety U.S. Pat. No. 7,403,486 and entitled "Signal level measurement and data connection quality analysis apparatus and methods."

BACKGROUND

Cable networks are ubiquitous in this day and age. Most households receive broadband Internet and television content through cable networks. Cable networks generally use coaxial cables for data transfer. Signal leakages from the coaxial cables and/or any other type of cables may arise due to faulty wiring or damages to the cables. These leakages are to be avoided to maintain the integrity of the data being transferred within the cable network.

Conventional leakage detection techniques, however, have several technical shortcomings. For example, conventional techniques require a technician to disconnect a customer from the cable network, use an external transmitter at the disconnected location to send a test signal, and use a receiver to determine whether the test signal can be wirelessly detected. If the test signal from the transmitter is detected, there is leakage. These techniques are therefore cumbersome: a customer has to be taken offline during the testing period—and a technician has to physically connect an external transmitter to the network and move to a different location with the receiver. Once the testing is performed, the technician has to perform the extra steps of disconnecting the external transmitter and reconnecting the customer. All of this is undesirable.

As such, a significant improvement for leakage detection in cable networks is desired.

SUMMARY

Embodiments disclosed herein solve the aforementioned technical problems and other technical problems and may provide other solutions as well. In one or more embodiments, a testing instrument is configured to identify orthogonal frequency division multiple access (OFDMA) upstream data profile (OUDP) patterns within OFDMA signals that are routinely transmitted from the customer's cable modem. As the testing instrument leverages a predetermined pattern for leakage detection, the need for using a separate external transmitter and the disconnection/reconnection of the customer is therefore eliminated. A technician may just move around with the testing instrument, which may determine that there is signal leakage if the known OUDP patterns are detected in scanned wireless radio frequency signals.

In an embodiment, a method of detecting radio frequency signal leakage in a wired cable network may be provided. The method may be performed by a testing instrument. The method may include scanning wireless radio frequency signals in a test area. The method may also include receiving a wireless radio frequency signal in response to the scanning and extracting a bit pattern from the received wireless radio frequency signal. The method may further include comparing the extracted bit pattern with one or more predetermined bit patterns associated with corresponding one or more cable modems in the wired cable network. The method may additionally include indicating that the received wireless radio frequency signal is a leakage signal from the wired cable network in response to determining that the extracted bit pattern matches at least one predetermined bit pattern of the one or more predetermined bit patterns.

In another embodiment, a system may be provided. The system may include a non-transitory storage medium storing computer program instructions and one or more processors configured to execute the computer program instructions to cause the system to perform operations. The operations may include scanning wireless radio frequency signals in a test area. The operations may also include receiving a wireless radio frequency signal in response to the scanning and extracting a bit pattern from the received wireless radio frequency signal. The operations may further include comparing the extracted bit pattern with one or more predetermined bit patterns associated with corresponding one or more cable modems in the wired cable network. The operations may additionally include indicating that the received wireless radio frequency signal is a leakage signal from the wired cable network in response to determining that the extracted bit pattern matches at least one predetermined bit pattern of the one or more predetermined bit patterns

BRIEF DESCRIPTION OF THE DRAWINGS

FIG. 2 shows a flow diagram for a method for detecting leakage radio frequency signals, based on the principles disclosed herein.

It should be understood that these figures are presented as examples only and therefore should not be considered limiting.

DETAILED DESCRIPTION OF SEVERAL EMBODIMENTS

Embodiments disclosed herein provide a significant improvement over the conventional technology of detecting radio frequency (RF) leakage signals in a cable network. Instead of disconnecting a customer and using an external transmitter to send a test signal, the embodiments may leverage an OUDP pattern generated by the cable modem. A testing instrument-without using an external transmitter—may extract patterns from detected wireless RF signals. If an extracted pattern matches a predetermined OUDP pattern, the testing instrument may indicate that RF leakage has been detected. If there are no matches, the testing instrument may indicate that no RF leakage has been detected and that the wiring is in good condition.

Embodiments disclosed herein may also be combined with other types of testing instruments or testing meters. That is, the functionality described throughout this disclosure may be integrated with other types of testing, e.g., testing quality of Data Over Cable Service Interface Specification (DOCSIS) digital signals, analog radio frequency (RF) signal levels with a wired connection (e.g., as described in U.S. Pat. No. 7,403,486), etc. Additionally, the embodiments disclosed herein may be integrated into testing devices that provide an external transmitter based functionality.

Figure 1:
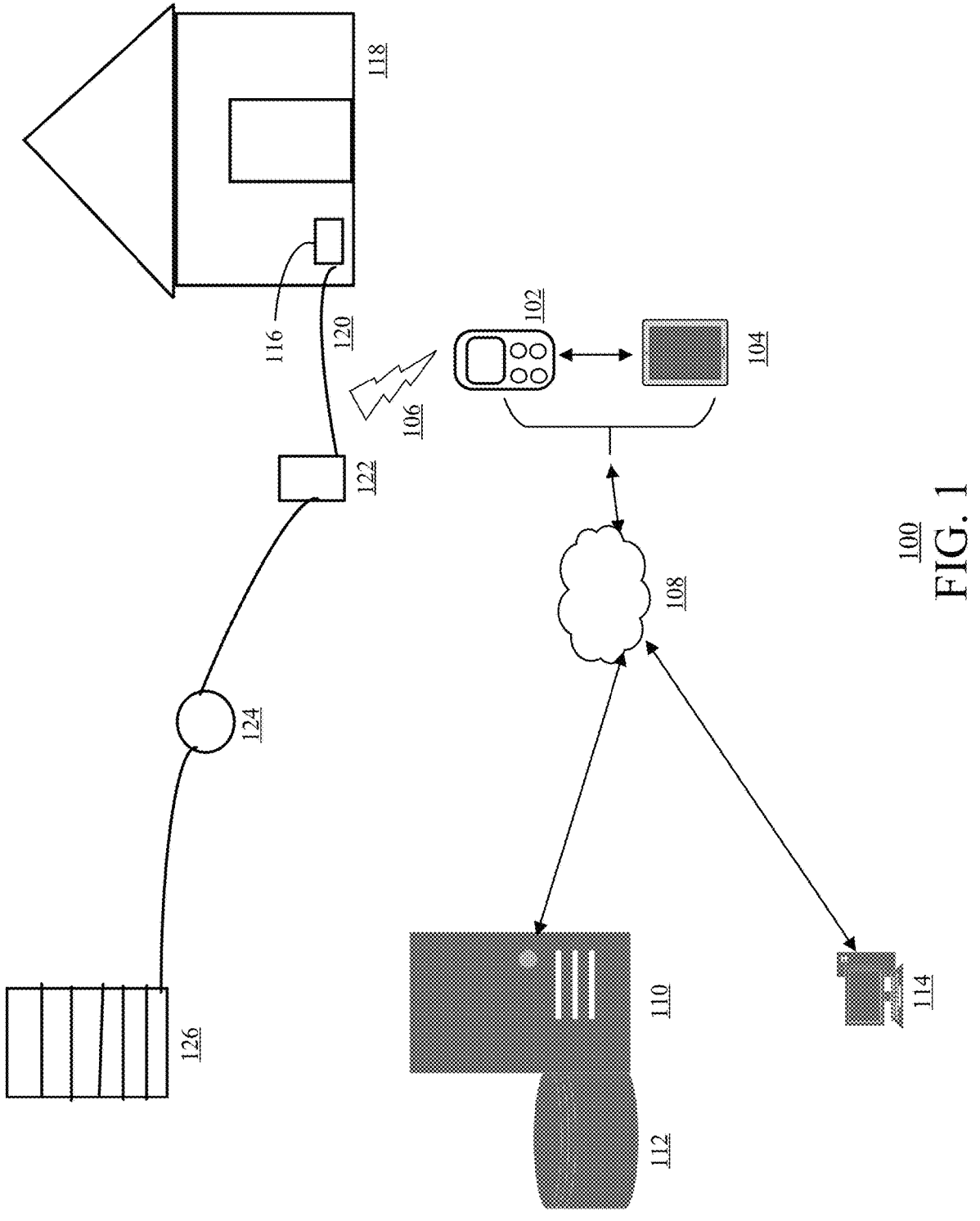
FIG. 1 shows an example network environment configured to implement the principles disclosed herein.

FIG. 1 shows an example network environment 100 configured to implement the principles disclosed herein. As shown, the network environment 100 includes a testing instrument 102 carried by a technician, mobile computing device 104 also carried by a technician, a network 108, a server computing device 110, a database 112, an admin computing device 114, a customer premises 118, a cable modem 116, a cable network provider 126, cable network components 122, 124, and a cable 120. The testing instrument 102 may be configured to detect RF leakage 106 from the cable 120, based on the principles disclosed herein. The shown network environment 100 is just an example, and any other type of network environment with additional, alternative, or fewer number of components should be considered within the scope of this disclosure.

The testing instrument 102 may be any type of electronic and/or computing device that is configured to detect the RF leakage 106 from the cable 120. The testing instrument 102 may include components such as a memory and a processor that may execute software modules to determine if a detected signal includes an OUDP pattern that is generated by the cable modem 116 (and/or any other cable modems in the vicinity). To that end, the testing instrument 102 may include a signal receiver to receive a signal, a signal processor to determine one or more patterns in the received signal, and a comparison algorithm to determine if the detected one or more patterns match an expected OUDP pattern. If there is a match, then the detected signal is the RF leakage 106 from the cable 120. In one or more embodiments, the testing instrument 102 may communicate with the server computing device 110 to indicate that the RF leakage 106 has been detected. In one or more embodiments, the testing instrument 102 may communicate with the mobile computing device 104, which in turn may communication with the server computing device 110. In addition to the functionality described throughout this disclosure, the testing instrument 102 may be provided in combination with other functionality. For instance, the testing instrument 102 may have a wired connection (not shown) to connect to the cable 120 (which may be a subscriber drop line to the customer premises 118). The wired connection may allow the testing instrument 102 to measure the quality of DOCSIS signals and/or RF signal levels of analog signals in the cable 120. Measurement of the quality of the DOCSIS signals and the RF signal levels is described in detail in U.S. Pat. No. 7,403,486, which is incorporated by reference in its entirety. Furthermore, the testing instrument 102 may be used for an external transmitter based leakage detection method.

The mobile computing device 104 may be any type of computing device carried by the technician. In one or more embodiments, the mobile computing device 104 may communicate with the testing instrument 102 to support the leakage detection functionality. For example, the mobile computing device 104 may allow the testing instrument 102 to communicate with the server computing device 110, provide an interface to the technician to interact with the testing instrument 102, and/or the like. The mobile computing device 104 may comprise any kind of computing device such as a mobile phone, a tablet computer, a laptop computer, and or the like. Structurally, the mobile computing device 104 may comprise a memory to store computer program instructions, a processor to execute the computer program instructions, a display to provide information to the technician, communication components to communicate through the network 108, and the like.

The cable network may be provided by the cable network provider 126 to the customer premises 118 and through the cable 120. In one more embodiments, the cable 120 may be a coaxial cable. The cable network may further include cable network components 122, 124 on the data path from the cable network provider 126 to the customer premises 118. The cable network components 122, 124 may include repeaters, signal boosters, switches, and/or any other type of components.

The network 108 (not to be conflated with the cable network described above) may be any kind of network that facilitates the communications between different components of the network environment 100. For example, the network 108 may operate through packet switching protocols (e.g., IP), circuit switching protocols (e.g., cellular telephony), or a combination of both. The network 108 may comprise wired links, wireless links (e.g., 5G, LTE), satellite links, and or any other types of links. Some non-limiting examples of the network 108 include local area network (LAN), metropolitan area network (MAN), and Wide Area Network (WAN) such as the Internet.

The server computing device 110 may comprise any kind of computing device configured to provide server functionality in the network environment 100. Although the server computing device 110 is shown as a single entity for illustration, the server computing device 110 may include a combination of a plurality of computing devices at the same geographical location or at geographically distributed locations. Some non-limiting examples of the server computing device 110 may include desktop computers, laptop computers, and the like. In some embodiments, the database 112 may be hosted by the server computing device 110. In other embodiments, the database 112 may be connected to the server computing device 110. The database 112 may comprise any kind of database such as object-oriented database, relational database, and or the like. The data in the database 112 may be sourced from other server computing devices and or other databases. The admin computing device 114 may be used by an admin network to provide instructions to the server computing device 110, the mobile computing device 104, and/or the testing instrument 102 to facilitate the implementation of the functionality described throughout this disclosure.

FIG. 2 shows a flow diagram for an example method 200 of detecting RF leakage signals, based on the principles disclosed herein. The steps of the method 200 may be performed by any combination of components of the network environment 100. Furthermore, the steps shown in FIG. 2 are merely examples; and methods with additional, alternate, or fewer number of steps are to be considered within the scope of this disclosure. Furthermore, the steps show example operations that are not be considered limiting. Also, the demarcation and the ordering of the steps is just for explanatory purposes and not to show a sequential operation.

The method 200 may begin at step 202, where a wireless RF signals in a test area may be scanned. For example, a technician may have installed a cable modem at a customer's premises and may wish to check the wiring integrity of the installation and/or of the cable network itself. The test area may be within the customer's premises, e.g., indoors, and/or nearby the customer's premises, e.g., front yard, backyard, etc. The scanning may be performed by a testing instrument and the technician may instruct the testing instrument to begin scanning, e.g., by pressing a button, selecting an icon on a touchscreen, etc. In one or more embodiments, the technician may instruct the testing instrument to begin scanning by providing a command through a mobile computing device (e.g., a smartphone) carried by the technician.

At step 204, the testing instrument may receive wireless RF signals in response to the scanning. For example, the testing instrument may receive multiple RF signals that may be present in the test area. In one or more embodiments, the testing instrument may scan for wireless signals within a predetermined frequency band. The testing instrument may select the scanned wireless RF signals, or a subset thereof, for further processing.

At step 206, a selected wireless RF signal may be processed to extract a bit pattern. The processing may be performed using any kind of digital processing technical and generally on a digital signal processor within the testing instrument. The processing may further include noise reduction, signal enhancement, and/or any other type of optimization such that the integrity of the extracted bit pattern may be maintained.

At step 208, the extracted bit pattern may be compared with predetermined bit patterns. The predetermined bit patterns may be associated with the cable modems within the cable network. For example, a predetermined bit pattern may include an OUDP pattern associated the cable modem (e.g., installed by the technician) in the customer's premises. The comparison may be performed using any type of comparison algorithm known in the art, and therefore not described here in detail.

At step 210, an indication may be generated that the selected wireless RF signal is a leakage signal in response to determining a match between the extracted bit pattern and at least one predetermined bit pattern (or no leakage if there no match). For instance, the extracted bit pattern may match the OUDP bit pattern associated with the cable modem in the customer's premises. The wireless RF signal that included the extracted bit pattern may therefore be a leaked RF signal from the wired connections (e.g., coaxial cables) within the cable network.

In one or more embodiments, the indication may be generated within the testing instrument itself. The testing instrument may, for example, include a screen that may visually display the detected, matched signal. Alternatively or additionally, the testing instrument may generate an audible signal. As the technical moves, the testing instrument may change the intensity and/or the frequency of the audible signal as the intensity of the detected leakage signal increases. This may allow the technician to move toward and pinpoint the area of the leakage. Additionally or alternatively, the testing instrument may generate a haptic indication. Similar to the audible signal, the intensity and/or the frequency of the haptic indication may change as the intensity of the detected leakage signal increases.

In one more embodiments, the indication may be generated in the mobile computing device carried by the technician. That is, the testing instrument may generate and transmit the indication to the mobile computing device through a local connection, e.g., Bluetooth®, Wi-Fi, etc. The mobile computing device may then provide visual, audible, and/or haptic indication, which may change according to the intensity of the detected leakage signal. The indication in the mobile electronic device may be provided in addition to or as an alternate to the indication in the testing instrument itself.

In one or more embodiments, the indication may be provided to a remote computing device such as a server. The indication may serve as a report of the detected signal leakage. In response, the server may store a record of the detected signal leakage along with a timestamp, location, identifier of the testing instrument, identifier of the technician, identifier of the customer, and/or any other attributes associated with the leakage.

If the scanned wireless RF signals do not have the predetermined pattern, the testing instrument may indicate that these RF signals are not leakage signals. When all of the selected wireless RF signals are processed and no leakage signals have been detected, the testing instrument may indicate that the integrity of the wiring (e.g., recently completed) by the technical is in a good condition.

In one or more embodiments, additional metrics associated with the leakage detection may be determined. For example, the measurements from the testing instrument may be used, e.g., by the remote computing device, to validate the service quality of the cable network, including but not limited adherence to data over cable service interface specification (DOCSIS) standard, data ingress, and/or the like. The remote computing device further geotrack the technician's path during the testing, record the time spent during the testing, and/or any other metrics associated with the testing. The remote computing device may generate a report of the testing including the additional metrics.

Figure 3:
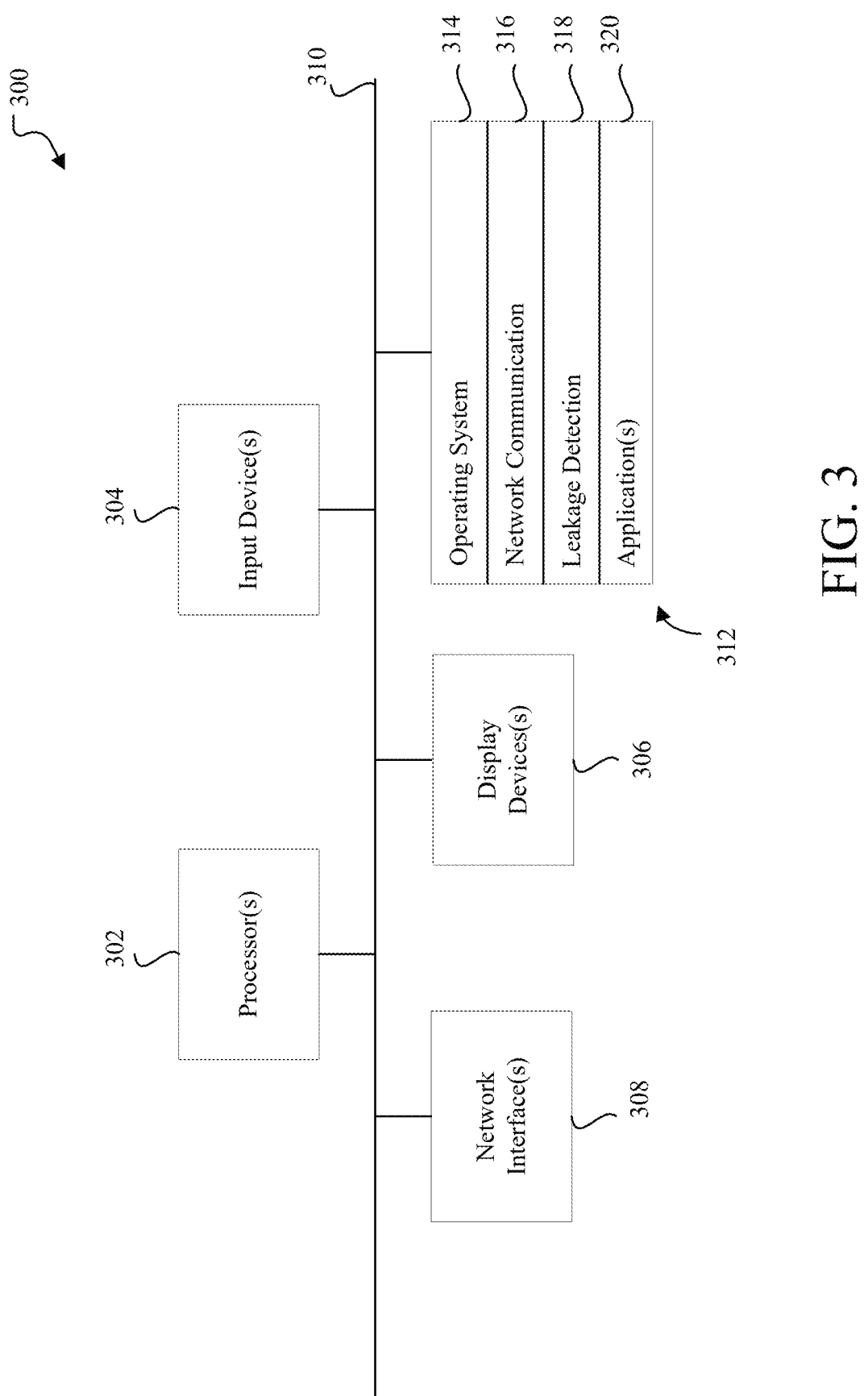
FIG. 3 shows a block diagram of an example computing device that implements various features and processes based on the principles disclosed herein.

FIG. 3 shows a block diagram of an example computing device 300 that implements various features and processes based on the principles disclosed herein. For example, computing device 300 function as testing instrument 102, mobile computing device 104, admin computing device 114, and server computing device 110. In one or more embodiments, the computing device 300 may be OneExpert CATV Module@ sold by Viavi Solutions®. The computing device 300 also performs one or more steps of the method 200. The computing device 300 is implemented on any electronic device that runs software applications derived from compiled instructions, including without limitation personal computers, servers, smart phones, media players, electronic tablets, game consoles, email devices, etc. In some implementations, the computing device 300 includes one or more processors 302, one or more input devices 304, one or more display devices 306, one or more network interfaces 308, and one or more computer-readable media 312. Each of these components is be coupled by a bus 310.

Display device 306 includes any display technology, including but not limited to display devices using Liquid Crystal Display (LCD) or Light Emitting Diode (LED) technology. Processor(s) 302 uses any processor technology, including but not limited to graphics processors and multi-core processors. Input device 304 includes any known input device technology, including but not limited to a keyboard (including a virtual keyboard), mouse, track ball, and touch-sensitive pad or display. Bus 310 includes any internal or external bus technology, including but not limited to ISA, EISA, PCI, PCI Express, USB, Serial ATA or FireWire. Computer-readable medium 312 includes any non-transitory computer readable medium that provides instructions to processor(s) 302 for execution, including without limitation, non-volatile storage media (e.g., optical disks, magnetic disks, flash drives, etc.), or volatile media (e.g., SDRAM, ROM, etc.).

Computer-readable medium 312 includes various instructions 314 for implementing an operating system (e.g., Mac OS®, Windows®, Linux). The operating system may be multi-user, multiprocessing, multitasking, multithreading, real-time, and the like. The operating system performs basic tasks, including but not limited to: recognizing input from input device 304; sending output to display device 306; keeping track of files and directories on computer-readable medium 312; controlling peripheral devices (e.g., disk drives, printers, etc.) which can be controlled directly or through an I/O controller; and managing traffic on bus 310. Network communications instructions 316 establish and maintain network connections (e.g., software for implementing communication protocols, such as TCP/IP, HTTP, Ethernet, telephony, etc.).

Leakage detection 318 includes instructions that implement the disclosed embodiments for detecting RF signal leakages in cable networks.

Application(s) 320 may comprise an application that uses or implements the processes described herein and/or other processes. The processes may also be implemented in the operating system.

The described features may be implemented in one or more computer programs that may be executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment. In one embodiment, this may include Python. The computer programs therefore are polyglots.

Suitable processors for the execution of a program of instructions may include, by way of example, both general and special purpose microprocessors, and the sole processor or one of multiple processors or cores, of any kind of computer. Generally, a processor may receive instructions and data from a read-only memory or a random access memory or both. The essential elements of a computer may include a processor for executing instructions and one or more memories for storing instructions and data. Generally, a computer may also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data may include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with a user, the features may be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features may be implemented in a computer system that includes a back-end component, such as a data server, or that includes a middleware component, such as an application server or an Internet server, or that includes a front-end component, such as a client computer having a graphical user interface or an Internet browser, or any combination thereof. The components of the system may be connected by any form or medium of digital data communication such as a communication network. Examples of communication networks include, e.g., a telephone network, a LAN, a WAN, and the computers and networks forming the Internet.

The computer system may include clients and servers. A client and server may generally be remote from each other and may typically interact through a network. The relationship of client and server may arise by virtue of computer programs running on the respective computers and having a client-server relationship to each other.

One or more features or steps of the disclosed embodiments may be implemented using an API. An API may define one or more parameters that are passed between a calling application and other software code (e.g., an operating system, library routine, function) that provides a service, that provides data, or that performs an operation or a computation.

The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API.

In some implementations, an API call may report to an application the capabilities of a device running the application, such as input capability, output capability, processing capability, power capability, communications capability, etc.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. For example, other steps may be provided, or steps may be eliminated, from the described flows, and other components may be added to, or removed from, the described systems. Accordingly, other implementations are within the scope of the following claims.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112 (f). Claims that do not expressly include the phrase "means for" or "step for" are not to be interpreted under 35 U.S.C. 112 (f).

What is claimed is:

1. A method of detecting radio frequency signal leakage in a wired cable network and performed by a testing instrument, the method comprising:

scanning wireless radio frequency signals in a test area;

receiving a wireless radio frequency signal in response to the scanning;

extracting a bit pattern from the received wireless radio frequency signal;

comparing the extracted bit pattern with one or more predetermined bit patterns associated with corresponding one or more cable modems in the wired cable network; and indicating that the received wireless radio frequency signal is a leakage signal from the wired cable network in response to determining that the extracted bit pattern matches at least one predetermined bit pattern of the one or more predetermined bit patterns.

2. The method of claim 1, further comprising:

indicating that the wireless radio frequency signal is not a leakage signal from the wired cable network in response to determining that the extracted bit pattern does not match any of the one or more predetermined bit patterns.

3. The method of claim 1, further comprising:

indicating that that wiring integrity of the wired cable network is in a good condition in response to determining that none of the scanned wireless radio frequency signals include any of the one or more predetermined bit patterns.

4. The method of claim 1, at least one of the one or more predetermined bit pattern comprising an orthogonal frequency division multiple access (OFDMA) upstream data profile (OUDP) associated with a corresponding cable modem.

5. The method of claim 1, the indicating comprising:

generating an indication on the testing instrument.

6. The method of claim 1, the indicating comprising:

transmitting an indication to a local computing device.

7. The method of claim 1, further comprising:

transmitting an indication to a remote computing device.

8. The method of claim 1 being performed after an installation of the cable modem.

9. The method of claim 1, further comprising:

determining additional metrics associated with leakage detection, the additional metrics including at least one of quality of the cable network, a technician's path during the leakage detection, or time spent performing the leakage detection.

10. The method of claim 1, further comprising:

determining at least one of radio frequency signal level or Data Over Cable Service Interface Specification (DOCSIS) digital signal quality.

11. A system comprising:

a non-transitory storage medium storing computer program instructions; and one or more processors configured to execute the computer program instructions to cause the system to perform operations comprising:

scanning wireless radio frequency signals in a test area;

receiving a wireless radio frequency signal in response to the scanning;

extracting a bit pattern from the received wireless radio frequency signal;

comparing the extracted bit pattern with one or more predetermined bit patterns associated with corresponding one or more cable modems in a wired cable network; and indicating that the received wireless radio frequency signal is a leakage signal from the wired cable network in response to determining that the extracted bit pattern matches at least one predetermined bit pattern of the one or more predetermined bit patterns.

12. The system of claim 11, the operations further comprising:

indicating that the wireless radio frequency signal is not a leakage signal from the wired cable network in response to determining that the extracted bit pattern does not match any of the one or more predetermined bit patterns.

13. The system of claim 11, the operations further comprising:

indicating that that wiring integrity of the wired cable network is in a good condition in response to determining that none of the scanned wireless radio frequency signals include any of the one or more predetermined bit patterns.

14. The system of claim 11, at least one of the one or more predetermined bit pattern comprising an orthogonal frequency division multiple access (OFDMA) upstream data profile (OUDP) associated with a corresponding cable modem.

15. The system of claim 11, the indicating comprising:

generating an indication on a testing instrument.

16. The system of claim 11, the indicating comprising:

transmitting an indication to a local computing device.

17. The system of claim 11, the operations further comprising:

transmitting an indication to a remote computing device.

18. The system of claim 11, the operations being performed after an installation of the cable modem.

19. The system of claim 11, the operations further comprising:

determining additional metrics associated with leakage detection, the additional metrics including at least one of quality of the cable network, a technician's path during the leakage detection, or time spent performing the leakage detection.

20. The system of claim 11, the operations further comprising:

determining at least one of radio frequency signal level or Data Over Cable Service Interface Specification (DOCSIS) digital signal quality.

* * * * *